(12) United States Patent
Mariotti et al.

(10) Patent No.: US 8,867,924 B2
(45) Date of Patent: Oct. 21, 2014

(54) LOW POWER CONSUMPTION SMALL FORM-FACTOR PLUGGABLE TRANSCEIVER

(75) Inventors: Carlo Mariotti, Monza (IT); Damiano Rossetti, Monza (IT); Carlo Tosetti, Sondrio (IT); Federico Fontanella, Seregno (IT)

(73) Assignee: Cisco Technology, Inc., San Jose, CA (US)

( * ) Notice: Subject to any disclaimer, the term of this patent is extended or adjusted under 35 U.S.C. 154(b) by 604 days.

(21) Appl. No.: 12/894,398

(22) Filed: Sep. 30, 2010

(65) Prior Publication Data

US 2012/0082462 A1 Apr. 5, 2012

(51) Int. Cl.
*H04B 10/12* (2006.01)
*H04B 10/04* (2006.01)
*H04B 10/40* (2013.01)

(52) U.S. Cl.
CPC ...................................... *H04B 10/40* (2013.01)
USPC ........... 398/182; 398/140; 398/192; 398/195; 398/197

(58) Field of Classification Search
None
See application file for complete search history.

(56) References Cited

U.S. PATENT DOCUMENTS

| 6,792,015 | B1* | 9/2004 | Theodoras et al. | 372/34 |
| 2002/0149812 | A1* | 10/2002 | Hong et al. | 359/110 |
| 2003/0095303 | A1* | 5/2003 | Cunningham et al. | 359/110 |
| 2006/0008210 | A1* | 1/2006 | Cornell et al. | 385/48 |
| 2010/0329693 | A1* | 12/2010 | Chen | 398/147 |

* cited by examiner

*Primary Examiner* — Darren E Wolf
(74) *Attorney, Agent, or Firm* — Edell, Shapiro & Finnan, LLC

(57) ABSTRACT

A method is provided to lower the overall power consumption of small form-factor pluggable (SFP) transceivers. The method includes receiving an indication to operate the SFP transceiver in a low power mode, and setting the SFP transceiver to a low power mode in response to the indication by at least switching off a thermal electric cooler (TEC) that controls a temperature of a laser diode of the SFP transceiver. The proposed method may be implemented whenever a reach is not more than a predetermined distance, for example, 65 kilometers. At such reduced distances, the TEC of the SFP transceiver can be switched off while still guaranteeing link functionality. The instant low power mode has the benefit of reducing the power consumption of the SFP transceiver so that, for example, host platforms with lower power delivery budgets can support the SFP transceiver for at least some applications.

20 Claims, 4 Drawing Sheets

LOW POWER CONSUMPTION SMALL FORM-FACTOR PLUGGABLE TRANSCEIVER

TECHNICAL FIELD

The present invention generally relates to a method of operating, in a low power mode, a small form-factor pluggable optical transceiver located at an endpoint of an optical data communication network.

BACKGROUND

Small form-factor pluggable (SFP) optical transceivers are pluggable input/output transceivers that can be used for converting electrical signals to optical signals and vice-versa. SFP transceivers can transmit data across communication networks using single mode optical fiber across distances from up to several meters to kilometers. For example, a short reach (SR) SFP transceiver can reach distances of up to 300 meters, while a long reach (LR) SFP transceiver and an extended reach (ER) SFP transceiver can reach distances of up to 25 kilometers and 40 kilometers, respectively. SFP transceivers are pluggable into host platforms that may be located at endpoints of communication networks.

DETAILED DESCRIPTION OF THE DRAWINGS

Overview

A method is provided to lower the overall power consumption of small form-factor pluggable (SFP) transceivers. The method includes receiving an indication to operate the SFP transceiver in a low power mode, and setting the SFP transceiver to a low power mode in response to the indication by at least switching off a thermal electric cooler (TEC) that controls a temperature of a laser diode of the SFP transceiver.

Switching off the TEC of the SFP transceiver lowers the power consumption of the SFP transceiver. At the lower power, the SFP transceiver may transmit optical signals over a shorter distance (i.e., reach) across single-mode optical fiber than when the SFP transceiver operates at a higher optical power. The proposed method for operating the SFP transceiver in a low power mode may be implemented whenever a reach is, e.g., not more than a predetermined distance, for example, 65 kilometers. At such reduced distances, the TEC of the SFP transceiver can be switched off while still guaranteeing link functionality. The instant low power mode has the benefit of reducing the power consumption of the SFP transceiver so that, for example, host platforms with lower power delivery budgets can support the SFP transceiver for at least some applications.

Example Embodiments

Figure 1:
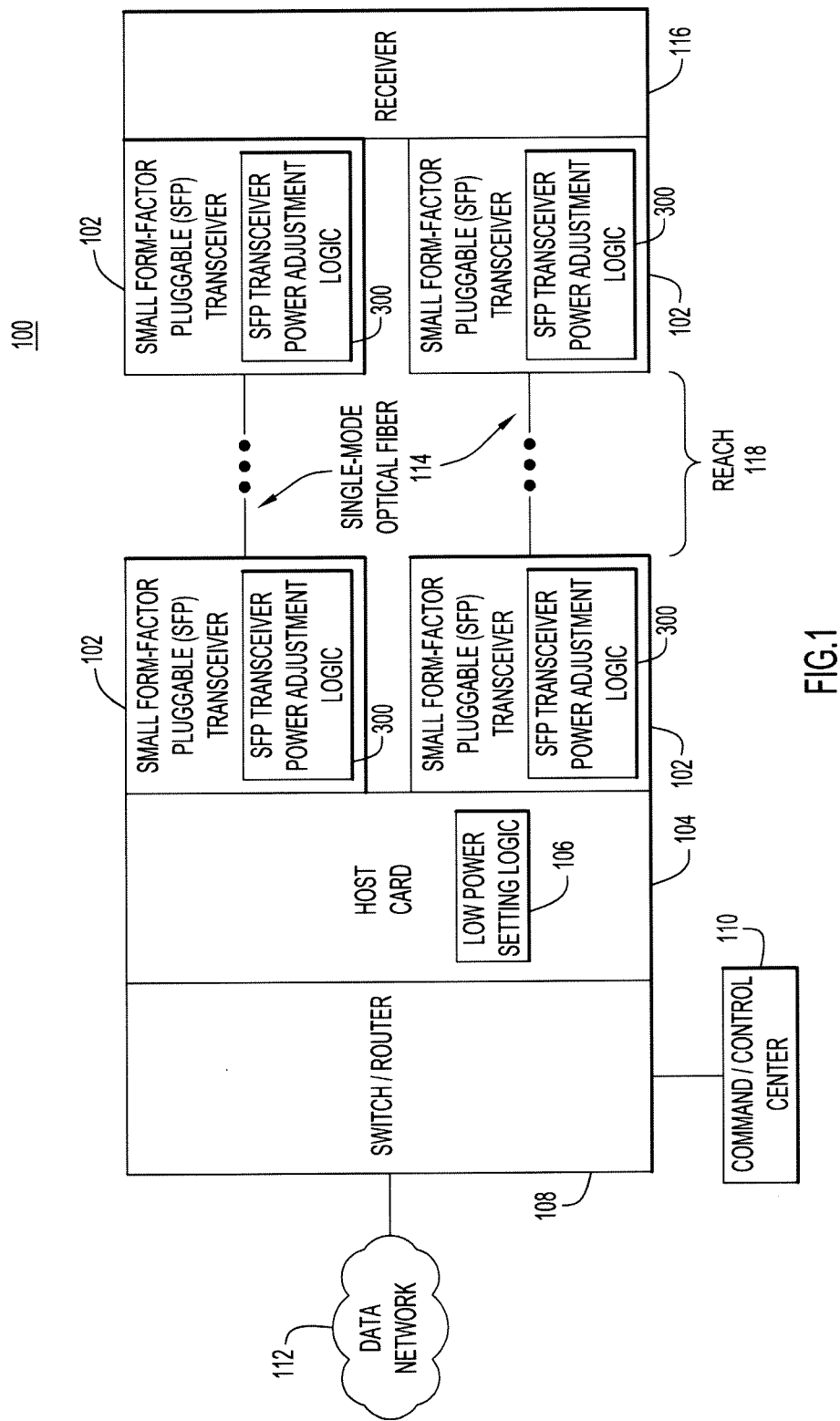
FIG. 1 is a block diagram showing an example of a network topology including a host card with low power setting logic and small form-factor pluggable (SFP) transceivers with SFP transceiver power adjustment logic.

Referring first to FIG. 1, an example network environment is shown at 100. Network environment 100 comprises multiple small form-factor pluggable (SFP) transceivers 102. The SFP transceivers 102 are configured to transmit optical signals across single-mode optical fiber 114 to a receiver 116 that typically also includes respective SFP transceivers. The SFP transceivers 102 transmit optical signals over a distance corresponding to reach 118. SFP transceivers 102 that operate in a low power mode may transmit optical signals over shorter distances than SFP transceivers 102 that operate in a higher power mode.

As shown, the SFP transceivers 102 each include SFP transceiver power adjustment logic 300, which is described in more detail later herein. The SFP transceivers 102 are coupled to host card 104 that includes low power setting logic 106. Network environment 100 also comprises a switch/router 108 that is coupled to host card 104, to command/control center 110, and to data network 112. Switch/router 108 is configured to receive signals from data network 112 and is also configured to receive commands remotely from, for example, command/control center 110, thus allowing the command/control center 110 to send signals to the SFP transceivers 102 via switch/router 108 and host card 104.

The SFP transceivers 102 can receive control signals (for example, a low power setting signal) from command/control center 110 or from host card 104. For example, command/control center 110 is capable of generating a low power setting signal remotely (e.g., at a location other than host card 104) to control operations of the SFP transceivers 102, and command/control center 110 may send the low power setting signal to the SFP transceivers 102 via switch/router 108 and host card 104. Similarly, host card 104 is capable of generating a low power setting signal to control operations of the SFP transceivers 102, and host card 104 may send the low power setting signal to the SFP transceivers 102 directly. The SFP transceivers 102 respond to the low power setting signal by entering into a low power mode, as described herein.

Figure 2:
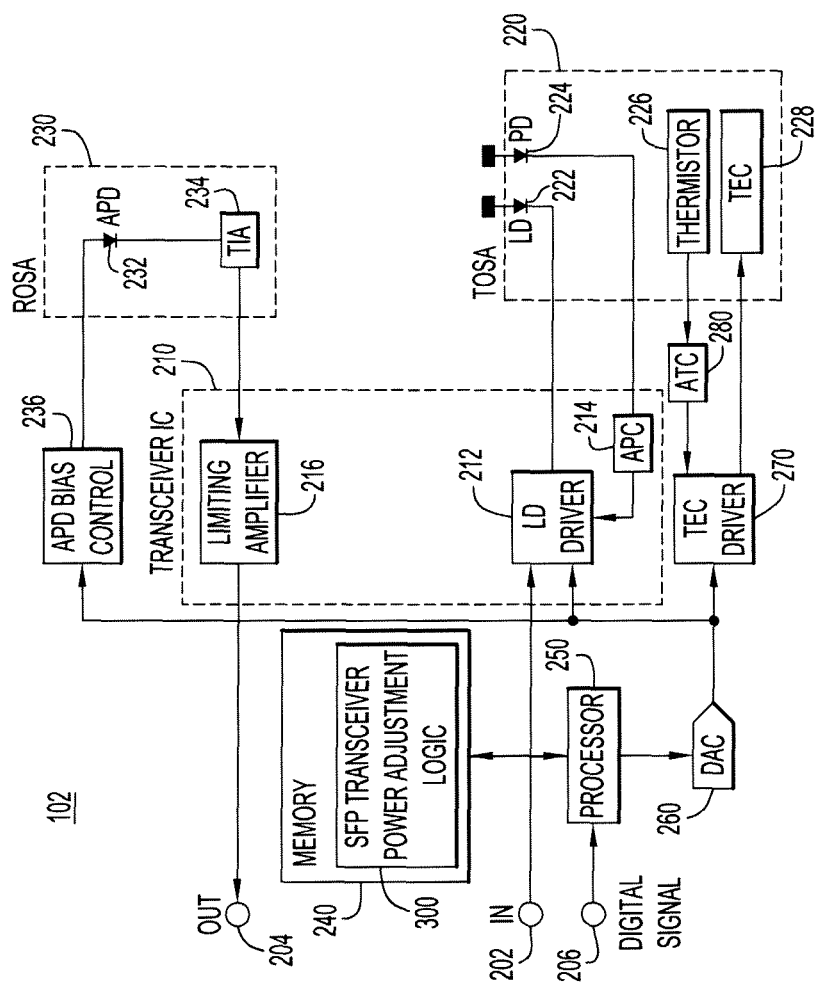
FIG. 2 is a block diagram of an SFP transceiver configured to be operated in a low power mode.

Turning to FIG. 2, a block diagram of SFP transceiver 102 is now described. SFP transceiver 102 has a transceiver integrated circuit (transceiver IC) 210, a transmitter optical sub-assembly (TOSA) 220, and a receiver optical sub-assembly (ROSA) 230. The transceiver IC 210 comprises a laser diode (LD) driver 212, an automatic power control (APC) module 214, and a limiting amplifier 216. The TOSA 220 comprises a laser diode (LD) 222, a photodiode (PD) 224, a thermistor 226, and a thermal electric cooler (TEC) 228. The ROSA 230 comprises an avalanche photo diode (APD) 232 and a transimpedance amplifier (TIA) 234. The components of SFP transceiver 102 are configured to receive, process, and output data and optical signals.

SFP transceiver 102 is configured to receive an input signal at input terminal 202. For example, the SFP transceiver 102 may receive a digital data stream for transmission via optical fiber 114. The input signal is transmitted from input terminal 202 to LD driver 212, which controls operations of LD 222. LD 222 is configured to produce an optical (i.e., laser) output in response to an output from LD driver 212. For example, LD 222 may transmit a laser output across reach 118 in network 100 in response to electrical signals received from LD driver 212. LD driver 212 also receives instructions from APC 214. APC 214 is coupled to PD 224, which is configured to transmit an electrical output signal in response to optical input. In one example, PD 224 may transmit an electrical signal to APC 214 in response to receiving an optical input from LD 222. APC 214 may then send instructions to LD driver 212 that cause LD driver 212 to control operations of LD 222 in order to minimize the output optical power difference between a target output optical power of LD 222 and an actual output optical power of LD 222.

SFP transceiver 102 is also configured to receive an optical signal and output an electrical signal at output terminal 204. For example, APD 232, controlled by APD bias control 236, may transmit an electrical output signal to TIA 234 in response to receiving an optical signal input. In this example, APD 232 may receive an optical input signal from another SFP transceiver 102 across reach 118 in network 100 and may convert the optical input signal into an electrical output signal. Upon receiving the electrical output of APD 232, TIA 234 may amplify the electrical output of APD 232 for input to limiting amplifier 216. The amplified signal may then be transmitted to output terminal 204.

The SFP transceiver 102 further includes a memory 240 and a processor 250. The memory 240 is, for example, random access memory (RAM) but may also comprise electrically erasable programmable read only memory (EEPROM), particularly for storage of logic instructions. Processor 250 is configured to receive a control signal from, for example, host card 104 and, in response, is configured to execute instructions stored in memory 240 for carrying out the various low power operation techniques described herein. For example, processor 250 may receive, at digital signal input terminal 206, a low power setting signal, or other control signal, from host card 104 or from command/control center 110 through host card 104. The low power setting signal may cause the processor 250 to execute program logic instructions (e.g., software) stored in memory 240 to place the SFP into a low power mode.

The power consumption of SFP transceiver 102 can be reduced, in accordance with an embodiment, by switching off TEC 228. In accordance with an embodiment, the SFP transceiver power adjustment logic 300 is configured with instructions that cause processor 250 to place the SFP transceiver 102 into a low power mode by modifying temperature and power settings of the SFP transceiver 102. For example, in one embodiment, processor 250, responsive to SFP transceiver power adjustment logic 300, sends via, e.g., digital to analog converter (DAC) 260, control signals to TEC driver 270 to switch "off" TEC 228.

TEC driver 270 may switch off TEC 228 by controlling an automatic temperature control (ATC) module 280 to set a target temperature of LD 222 equal to the actual temperature of LD 222 that is read by thermistor 226. In another embodiment, TEC driver 270 may switch off TEC 228 by setting a temperature loop gain of ATC 280 to zero such that the difference between the target temperature of LD 222 and the actual temperature of LD 222 read by thermistor 226 is zero. In these examples, LD 222 does not need to be cooled because the target temperature and actual temperature are the same, and thus, TEC 228 is effectively inactive (i.e. switched "off") because it does not need to cool LD 222.

Once TEC 228 has been switched off, processor 250 can adjust the output target optical power of SFP transceiver 102 to operate in a low (optical) power mode. To accomplish this, processor 250 may modify the loop gain of APC 214. For example, processor 250 may send a control signal via, e.g., DAC 260 to LD driver 212 to set the loop gain of APC 214 to a low output target power.

Figure 3:
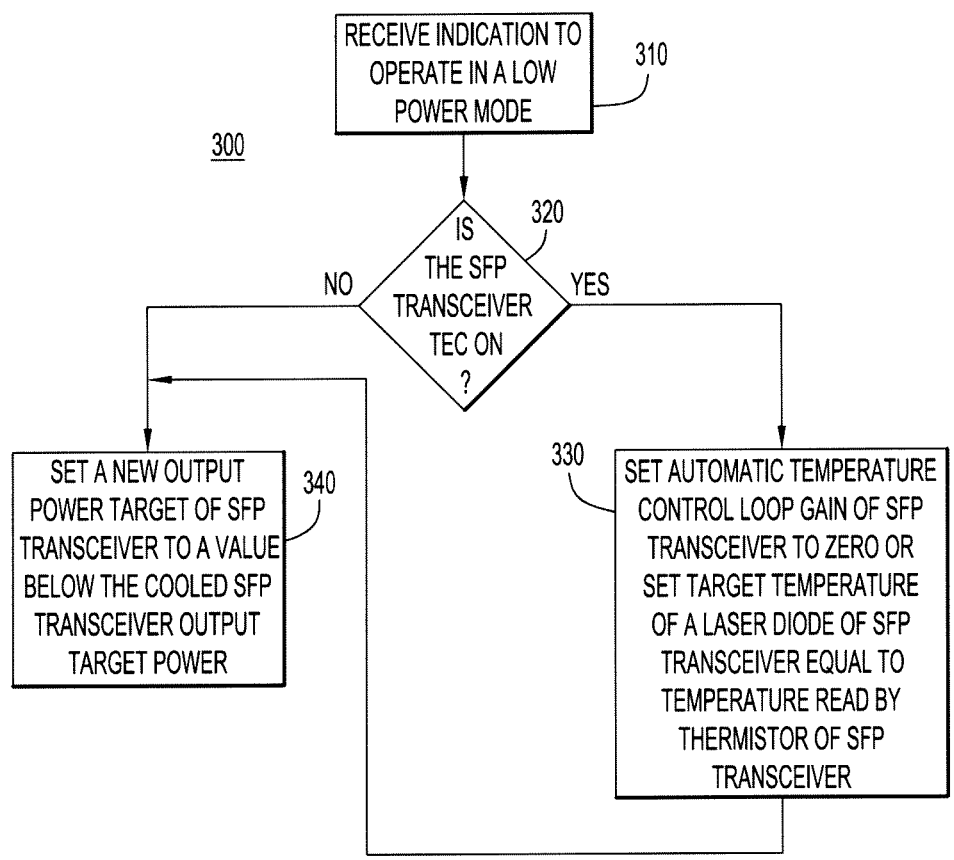
FIG. 3 is an example flow chart depicting how the SFP transceiver power adjustment logic places the SFP transceiver into a low power mode.

Turning to FIG. 3, an example flow chart is shown that depicts how the SFP transceiver power adjustment logic 300 sets the SFP transceiver 102 to a low power mode. At 310, processor 250 of SFP transceiver 102 receives an indication to operate SFP transceiver 102 in a low power mode. Processor 250 may be provided with an indication to operate in a low power mode when, for example, reach 118 is less than a predetermined distance, for example, 65 kilometers. At such reduced distances, the SFP transceiver 102 may operate without TEC 228 needing to cool LD 222, thus reducing the overall power consumption of the SFP transceiver 102. Processor 250 may also receive an indication to operate SFP transceiver 102 in a low power mode when, for example, a bit error rate of communication between, e.g., the SFP transceiver 102 coupled to host card 104 and the SFP transceivers 102 coupled to receiver 116 is less than a predetermined threshold. With such low bit error rates, the full optical power of the SFP transceiver 102 may not be needed and thus the SFP transceiver 102 may operate without the increased power enabled by a cooled LD 222.

Furthermore, processor 250 may receive the indication to operate SFP transceiver 102 in a low power mode automatically from the SFP transceiver 102 itself, automatically from host card 104 with which the SFP transceiver 102 is coupled, or manually from a location other than the host card 104 (e.g., command/control center 110).

In one example, processor 250 receives an indication to operate in a low power mode automatically from the SFP transceiver 102 itself when the SFP transceiver 102 detects that host card 104 is of a type that cannot support the electrical power consumption of the SFP transceiver 102 not operating in the low power mode.

In another example, processor 250 receives an indication to operate SFP transceiver 102 in a low power mode automatically from host card 104 upon receiving a low power setting signal from host card 104. The low power setting signal from host card 104 may be generated by low power setting logic 106, which may automatically determine whether the SFP transceiver 102 should operate in a low power mode based on network conditions, for example, the distance corresponding to reach 118 (which may, for example, be indicated in a configuration file) or a bit error rate, as described above.

In another example, a handshake signal exchange between host card 104 and SFP transceiver 102 may be initiated that may enable the host card 104 to determine electrical power consumption attributes of the SFP transceiver 102. If the electrical power consumption of the SFP transceiver 102 is higher than can be supported by host card 104, host card 104 may transmit the low power setting signal to the SFP transceiver 102 to operate SFP transceiver 102 in a low power mode.

In another example, processor 250 receives an indication to operate SFP transceiver 102 in a low power mode manually from command/control center 110 upon receiving a low power setting signal from command/control center 110 through switch 108 and host card 104. More specifically, SFP transceiver 102 may receive a low power setting signal from command/control center 110 through an internetwork operating system (IOS) command to activate or deactivate components of the SFP transceiver 102 such as TEC 228. In this example, and once again, the low power setting signal from command/control center 110 may be transmitted to the SFP transceiver 102 based on network conditions, for example, the distance corresponding to reach 118 or a bit error rate, as described above.

Referring back to FIG. 3, processor 250 determines, at 320, whether TEC 228 of SFP transceiver 102 is switched on. As described above, TEC 228 of SFP transceiver 102 may be switched on to operate SFP transceiver 102 in a "cooled" mode by controlling or lowering the temperature of LD 222. If processor 250 determines that TEC 228 of SFP transceiver 102 is switched on, processor 250, at 330, switches off TEC 228 by, e.g., as explained above, setting a loop gain of ATC 280 to zero or by setting a target temperature of LD 222 equal to the actual temperature of LD 222 that is read by thermistor 226. Once the TEC 228 is switched off, SFP transceiver 102 thereafter operates in an "uncooled" or low power mode thereafter.

If processor 250 determines, at 320, that TEC 228 of SFP transceiver 102 is already switched off, or alternatively, after processor 250 switches off TEC 228 at 330, processor 250, at 340, lowers the optical output target power of SFP transceiver 102 to operate the SFP transceiver 102 in the low power mode. For example, processor 250 may lower the optical output target power of SFP transceiver 102 by setting a new output target power of the SFP transceiver 102 in the uncooled mode to a value below the output target power of the SFP transceiver 102 in the cooled mode.

Figure 4:
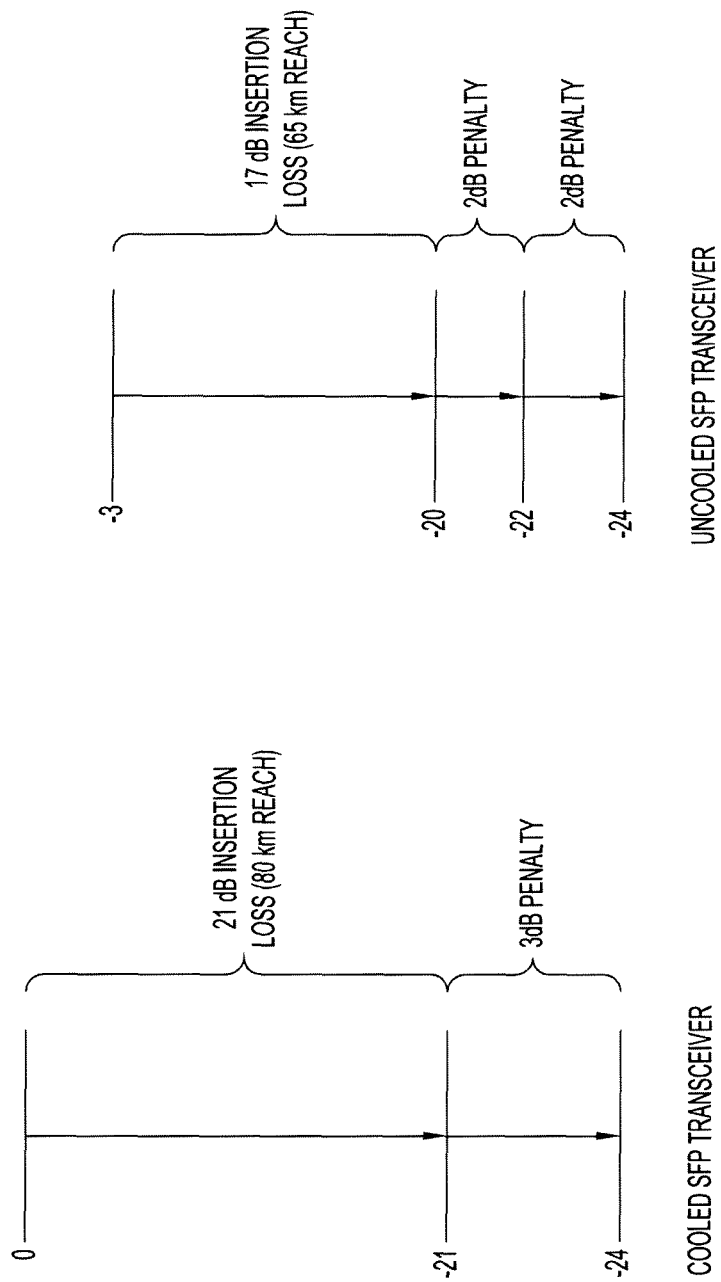
FIG. 4 depicts output target power ranges for cooled SFP transceivers and uncooled (low power mode) SFP transceivers.

Turning to FIG. 4, the optical output target power ranges are shown for SFP transceiver 102 operating in a cooled mode and an uncooled (low power) mode. FIG. 4 shows an example 24 dB power spectrum. In this example, SFP transceiver 102 can operate at an 80 kilometer reach distance in a cooled mode, assuming a 3 dB penalty. When TEC 228 is switched off, SFP transceiver 102 operates in an uncooled (low power) mode and can operate at a 65 kilometer reach distance, assuming a 2 dB penalty and a 2 dB margin. Thus, the optical output target power for SFP transceiver 102 in the uncooled (low power) mode can be set to 3 dB less than the optical output target power for SFP transceiver 102 in the cooled mode (as explained below) and will still deliver sufficient optical power to close the optical link.

In one SFP transceiver implementation, the LD 222 operates at an average temperature of 45 degrees Celsius in a cooled mode (when TEC 228 is switched on), and the maximum optical power variation once TEC 228 is switched off (uncooled mode) corresponds to about 1.5 dB. That is, switching off TEC 228 reduces the optical output target power of the SFP transceiver by 1.5 dB. Thus, assuming the output power for the cooled mode is 0 dB, the uncooled SFP transceiver will provide a maximum optical output power of −1.5 dB. A further penalty of 1.5 dB, that may be caused, for example, by transceiver degradation, may be assumed, resulting in an optical output target power of the transceiver in the low power mode of −3 dB, or 3 dB below the optical output target power of the transceiver in the cooled mode.

It is noted that in order to implement the low power feature by switching off TEC 228 of the SFP transceiver 102, hardware changes to the SFP transceiver 102 may not be needed. Instead, firmware upgrades (e.g., SFP transceiver power adjustment logic 300) may enable the operation of the SFP transceiver 102 in a low power mode, allowing the use of a single package identifier (PID) for both low power and full power operable devices. The main parameter impacted by the switching off TEC 228 of SFP transceiver 102 is the optical output power of SFP transceiver 102. As noted, the output target power is achieved both by cooling or heating a laser diode controlled by TEC 228 and by imposing a proper power setting by, e.g., controlling the laser bias current. Both actions may be implemented using the APC 214 and ATC 280.

It is noted that the operations of processor 250 may be implemented by logic encoded in one or more tangible media (e.g., embedded logic such as an application specific integrated circuit, digital signal processor instructions, software that is executed by a processor, etc), wherein memory 240 stores data used for the operations described herein and stores software or processor executable instructions that are executed to carry out the operations described herein. The SFP transceiver power adjustment logic 300 may take any of a variety of forms, so as to be encoded in one or more tangible media for execution, such as fixed logic or programmable logic instructions (e.g., software/computer instructions executed by a processor) and the processor 250 may be an application specific integrated circuit (ASIC) that comprises fixed digital logic, or a combination thereof. For example, processor 250 may be embodied by digital logic gates in a fixed or programmable digital logic integrated circuit, which digital logic gates are configured to perform the operations for the SFP transceiver power adjustment logic 300. In one form, SFP transceiver power adjustment logic 300 may be embodied in a processor or computer-readable memory medium (memory 240) that is encoded with instructions for execution by a processor (e.g. a processor 250) that, when executed by the processor, are operable to cause the processor to perform the operations described herein in connection with the SFP transceiver power adjustment logic 300.

The low power setting logic 300 described above allows the SFP transceiver 102 to operate in a low power mode, thus providing the necessary output power to guarantee link functionality over an operational temperature range of the SFP transceiver 102. The host card 104 may activate the low power mode of the SFP transceiver 102 by utilizing a high level protocol to communicate with the SFP transceiver 102.

In sum, embodiments described herein enable SFP transceivers to be operated in a low power mode by at least switching off a TEC that controls a temperature of a laser diode of the SFP transceiver.

The above description is intended by way of example only. Various modifications and structural changes may be made therein without departing from the scope of the concepts described herein and within the scope and range of equivalents of the claims.

What is claimed is:

1. A method, comprising:
   determining whether or not to operate a small form-factor pluggable (SFP) transceiver in a low power mode based on a desired reach for the SFP transceiver after a thermal electric cooler (TEC) has been effectively switched off;
   when the determining indicates that the SFP transceiver is to operate in the low power mode, instructing a processor of the SFP transceiver to send a signal to a TEC driver to modify an intended operation of an automatic temperature control module to set a loop gain of the automatic temperature control module to zero such that a difference between a target temperature of a laser diode of the SFP transceiver and an actual temperature of the laser diode as indicated by a thermistor of the SFP transceiver is zero to effectively switch off the TEC that controls a temperature of the laser diode of the SFP transceiver; and
   adjusting output target power of the SFP transceiver to operate in the low power mode.

2. The method of claim 1, wherein determining comprises determining that the SFP transceiver is to operate in the low power mode when the desired reach between two endpoints in an optical data communication network is less than a predetermined distance.

3. The method of claim 2, wherein determining comprises determining that the SFP transceiver is to operate in the low power mode when the desired reach is less than 65 kilometers.

4. The method of claim 1, wherein instructing comprises setting the SFP transceiver to the low power mode by setting an automatic temperature control loop gain to zero by setting the temperature of the laser diode to the target temperature.

5. The method of claim 1, wherein instructing comprises setting the SFP transceiver to the low power mode by setting the target temperature of the laser diode of the SFP transceiver equal to a temperature read by the thermistor of the SFP transceiver.

6. The method of claim 1, further comprising setting a new output target power for the SFP transceiver, wherein the new output target power is a value that is less than a value corresponding to an output target power for the SFP transceiver when the TEC is not switched off.

7. The method of claim 6, wherein setting the new output target power comprises setting the new output target power at a value of 3 dB below the value corresponding to the output target power for the SFP transceiver when the TEC is not switched off.

8. The method of claim 1, wherein determining comprises determining that the SFP transceiver is to operate in the low power mode by receiving a low power setting signal from a host card with which the SFP transceiver is coupled.

9. The method of claim 8, further comprising receiving the low power setting signal that is generated at a location other than the host card.

10. The method of claim 1, further comprising detecting a bit error rate for a transmission between two endpoints in an optical data communication network employing the SFP transceiver and determining that the SFP transceiver is to operate in the low power mode when the bit error rate is less than a predetermined threshold.

11. A non-transitory computer-readable memory that stores instructions that, when executed by a processor, cause the processor to:
 determine whether or not to operate a small form-factor pluggable (SFP) transceiver in a low power mode based on a desired reach for the SFP transceiver after a thermal electric cooler (TEC) has been effectively switched off;
 when the determining indicates that the SFP transceiver is to operate in the low power mode, instruct a processor of the SFP transceiver to send a signal to a TEC driver to modify an intended operation of an automatic temperature control module to set a loop gain of the automatic temperature control module to zero such that a difference between a target temperature of a laser diode of the SFP transceiver and an actual temperature of the laser diode as indicated by a thermistor of the SFP transceiver is zero to effectively switch off the TEC that controls a temperature of the laser diode of the SFP transceiver; and
 adjust output target power of the SFP transceiver to operate in the low power mode.

12. The computer-readable memory of claim 11, wherein the instructions that cause the processor to determine comprise instructions that cause the processor to determine that the SFP transceiver is to operate in the low power mode when the desired reach between two endpoints in an optical data communication network is less than a predetermined distance.

13. The computer-readable memory of claim 12, wherein the instructions that cause the processor to determine comprise instructions that cause the processor to determine that the SFP transceiver is to operate in the low power mode when the desired reach is less than 65 kilometers.

14. The computer-readable memory of claim 11, wherein the instructions that cause the processor to instruct comprise instructions that cause the processor to set an automatic temperature control loop gain to zero by setting the temperature of the laser diode to the target temperature.

15. The computer-readable memory of claim 11, wherein the instructions that cause the processor to instruct comprise instructions that cause the processor to set the target temperature of the laser diode of the SFP transceiver equal to a temperature read by the thermistor of the SFP transceiver.

16. The computer-readable memory of claim 11, further comprising instructions that cause the processor of the SFP transceiver to set a new output target power for the SFP transceiver, wherein the new output target power is a value that is less than a value corresponding to an output target power for the SFP transceiver when the TEC is not switched off.

17. The computer-readable memory of claim 16, wherein the instructions that cause the processor of the SFP transceiver to set the new output target power comprise instructions that cause the processor of the SFP transceiver to set the new output target power at a value of 3 dB below the value corresponding to the output target power for the SFP transceiver when the TEC is not switched off.

18. The computer-readable memory of claim 11, wherein the instructions that cause the processor to determine comprise instructions that cause the processor to determine that the SFP transceiver is to operate in the low power mode by receiving a low power setting signal from a host card with which the SFP transceiver is coupled.

19. The computer-readable memory of claim 18, further comprising instructions that cause the processor to receive the low power setting signal that is generated at a location other than the host card.

20. The computer-readable memory of claim 11, further comprising instructions that cause the processor to detect a bit error rate for a transmission between two endpoints in an optical data communication network employing the SFP transceiver and determine that the SFP transceiver is to operate in the low power mode when the bit error rate is less than a predetermined threshold.

* * * * *